US012400120B2

(12) United States Patent
Lee et al.

(10) Patent No.: US 12,400,120 B2
(45) Date of Patent: Aug. 26, 2025

(54) METHOD AND APPARATUS WITH NEURAL NETWORK OPERATION USING SPARSIFICATION

(71) Applicants: Samsung Electronics Co., Ltd., Suwon-si (KR); Ulsan National Institute of Science and Technology, Ulsan (KR)

(72) Inventors: Sehwan Lee, Seongnam-si (KR); Hyeon Uk Sim, Iksan-si (KR); Jongeun Lee, Ulsan (KR)

(73) Assignees: Samsung Electronics Co., Ltd., Suwon-si (KR); Ulsan National Institute of Science and Technology, Ulsan (KR)

( * ) Notice: Subject to any disclaimer, the term of this patent is extended or adjusted under 35 U.S.C. 154(b) by 1038 days.

(21) Appl. No.: 17/398,296

(22) Filed: Aug. 10, 2021

(65) Prior Publication Data
US 2022/0284299 A1    Sep. 8, 2022

(30) Foreign Application Priority Data

Mar. 4, 2021  (KR) .................. 10-2021-0028664
Mar. 18, 2021 (KR) .................. 10-2021-0035050

(51) Int. Cl.
*G06N 3/084*   (2023.01)
*G06F 18/21*   (2023.01)
(Continued)

(52) U.S. Cl.
CPC ....... *G06N 3/084* (2013.01); *G06F 18/21345* (2023.01); *G06F 18/214* (2023.01); *G06F 18/217* (2023.01); *G06N 3/048* (2023.01)

(58) Field of Classification Search
CPC ...... G06N 3/084; G06N 3/048; G06F 18/217; G06F 18/214
See application file for complete search history.

(56) References Cited

U.S. PATENT DOCUMENTS 10,691,996 B2 *  6/2020  Han ................. G06N 3/082
11,030,528 B1 *  6/2021  Zhuo ............... G06N 3/045
(Continued)

FOREIGN PATENT DOCUMENTS

KR   10-2018-0092810 A   8/2018
KR   10-2018-0093970 A   8/2018
(Continued)

OTHER PUBLICATIONS

Ji Zhengping et al. KR 20180092810 A, published Aug. 20, 2018, English translation (Year: 2018).*
(Continued)

*Primary Examiner* — Barbara M Level
(74) *Attorney, Agent, or Firm* — NSIP Law (57) ABSTRACT

A processor-implemented neural network operation method includes: receiving a first activation gradient and a first threshold corresponding to a layer included in a neural network; sparsifying the first activation gradient based on the first threshold; determining a second activation gradient by performing a neural network operation based on the sparsified first activation gradient; determining a second threshold by updating the first threshold based on the second activation gradient; and performing a neural network operation based on the second activation gradient and the second threshold.

21 Claims, 6 Drawing Sheets (51) Int. Cl.
  *G06F 18/2134* (2023.01)
  *G06F 18/214* (2023.01)
  *G06N 3/048* (2023.01)

(56) References Cited

U.S. PATENT DOCUMENTS

| | | | |
|---|---|---|---|
| 2013/0138589 A1 | 5/2013 | Yu et al. | |
| 2017/0193361 A1 | 7/2017 | Chilimbi et al. | |
| 2017/0337472 A1* | 11/2017 | Durdanovic | G06N 3/045 |
| 2018/0181864 A1* | 6/2018 | Mathew | G06N 3/084 |
| 2018/0232640 A1* | 8/2018 | Ji | G06N 3/045 |
| 2019/0042542 A1* | 2/2019 | Narayanamoorthy | G06F 17/16 |
| 2019/0188567 A1* | 6/2019 | Yao | G06N 3/082 |
| 2019/0370645 A1 | 12/2019 | Lee et al. | |
| 2020/0104717 A1* | 4/2020 | Alistarh | G06N 3/045 |
| 2020/0110988 A1* | 4/2020 | Wang | G06N 3/063 |
| 2020/0125938 A1* | 4/2020 | Du | G06N 3/063 |
| 2020/0151571 A1 | 5/2020 | Wu | |
| 2020/0202213 A1* | 6/2020 | Darvish Rouhani | G06N 3/084 |
| 2021/0256385 A1* | 8/2021 | Wang | G06F 18/2136 |
| 2021/0295168 A1* | 9/2021 | Xu | G06F 17/18 |
| 2022/0164663 A1* | 5/2022 | Liu | G06N 3/084 |
| 2023/0394312 A1* | 12/2023 | Ghosh | G06N 3/0495 |

FOREIGN PATENT DOCUMENTS

| | | |
|---|---|---|
| KR | 10-2019-0139115 A | 12/2019 |
| KR | 10-2020-0145648 A | 12/2020 |
| WO | WO 2019/246491 A1 | 12/2019 |

OTHER PUBLICATIONS

Eyal Hochberg et al. KR 20200145648 A, published Dec. 12, 2020, English translation, (Year: 2020).*

Wikipedia Multiply-accumulate operation, Archive Feb. 25, 2021, 5 pages (Year: 2021).*

Xie, Dong-liang et al. CN 107239824 A, published Oct. 10, 2017, English translation, 63 pages (Year: 2017).*

Wang et al., Learning soft threshold for sparsere parameterization using gradual projection operators ,Neurocomputing, Dept. of Electromechanical Engineering, Gauangzhou City Polytechnic, Guangzhou 510405, China, 10 pages (Year: 2022).*

Cai, et al. "Long Live Time: Improving Lifetime for Training-In-Memory Engines by Structured Gradient Sparsification." *Proceedings of the 55th Annual Design Automation Conference.* 2018. (6 pages in English).

Lee, et al. "Acceleration of DNN Backward Propagation by Selective Computation of Gradients." *Proceedings of the 56th Annual Design Automation Conference* 2019. (6 pages in English).

Sun, et al. "meProp: Sparsified Back Propagation for Accelerated Deep Learning with Reduced Overfitting." *International Conference on Machine Learning.* PMLR, Mar. 11, 2019 (10 pages in English).

Sim, et al. "SparTANN: Sparse Training Accelerator for Neural Networks with Threshold-based Sparsification." *Proceedings of the ACM/IEEE International Symposium on Low Power Electronics and Design.* 2020. (6 pages in English).

Lin, et al. "Deep Gradient Compression: Reducing the Communication Bandwidth for Distributed Training." *Published as a conference paper at ICLR* Jun. 23, 2020 (14 pages in English).

Ye, Xucheng, et al. "Accelerating CNN Training by Pruning Activation Gradients." Computer Vision-ECCV 2020: 16th European Conference, arXiv:1908.00173v3 [cs.LG] Jul. 20, 2020, (16 pages in English).

Korean Office Action issued on Jan. 30, 2023, in counterpart Korean Patent Application No. 10-2021-0035050 (4 pages in English, 8 pages in Korean).

* cited by examiner

METHOD AND APPARATUS WITH NEURAL NETWORK OPERATION USING SPARSIFICATION

CROSS-REFERENCE TO RELATED APPLICATIONS

This application claims the benefit under 35 USC § 119(a) of Korean Patent Application No. 10-2021-0028664 filed on Mar. 4, 2021, and Korean Patent Application No. 10-2021-0035050 filed on Mar. 18, 2021, in the Korean Intellectual Property Office, the entire disclosures, all of which, are incorporated herein by reference for all purposes.

BACKGROUND

1. Field

The following description relates to a method and apparatus with a neural network operation using sparsification.

2. Description of Related Art

To process a large amount of computation in a deep neural network (DNN), hardware such as graphics processing units (GPU), multi-GPU, field-programmable gate arrays (FPGA), application-specific integrated circuits (ASIC), and software such as model compression and sparsification may be used. Further, co-designs considering both hardware research and software may be used.

However, there are some issues in applying conventional architectures and algorithms to training. The first issue is that training demands greater computation and memory than inference. Further, training demands higher precision than inference. While a decrease in inference accuracy is likely to be overcome by re-training, a decrease in training accuracy leads to decreased learning rate/recognition rate.

A DNN may have a high sparsity, which may be useful to reduce the amount of computation and the memory demand and thus, particularly, may be utilized in inference, but not much in training.

The conventional gradient sparsification technique (top-k) failed to reduce the memory demand and requires additional time for preprocessing (for example, sorting). Further, the conventional sparse matrix multiplication architectures (for example, efficient inference engine (EIE)) cause large overhead in hardware such as a controller compared to the reduced amount of computation, due to the irregularity of elements.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network operation method includes: receiving a first activation gradient and a first threshold corresponding to a layer included in a neural network; sparsifying the first activation gradient based on the first threshold; determining a second activation gradient by performing a neural network operation based on the sparsified first activation gradient; determining a second threshold by updating the first threshold based on the second activation gradient; and performing a neural network operation based on the second activation gradient and the second threshold.

The first activation gradient and the second activation gradient may include any one of a gradient with respect to input activation, a gradient with respect to weight, and a gradient with respect to output activation.

The determining of the second threshold may include determining the second threshold by updating the first threshold over a predetermined number of iterations.

The determining of the second threshold may include determining the second threshold by updating the first threshold based on a target sparsity and a sparsity corresponding to a current iteration.

The determining of the second threshold may include determining the second threshold by multiplying the first threshold and a value of the target sparsity divided by the sparsity corresponding to the current iteration.

The determining of the second threshold may include: determining whether the second threshold exceeds a preset limited range; and correcting the second threshold to a value within the limited range in response to the second threshold exceeding the limited range.

The determining of the second threshold may include determining the second threshold by initializing the first threshold based on the second activation gradient.

The performing of the neural network operation based on the second activation gradient and the second threshold may include: generating sparse data by sparsifying the second activation gradient based on the second threshold; and performing, using the sparse data and dense data, the neural network operation based on the second activation gradient and the second threshold.

The dense data may be stored in parallelized dense buffers.

The performing of the neural network operation based on the second activation gradient and the second threshold may include performing one or more multiply-accumulate (MAC) operations based on the second activation gradient.

In one general aspect, one or more embodiments include a non-transitory computer-readable storage medium storing instructions that, when executed by a processor, configure the processor to perform any one, any combination, or all operations and methods described herein.

In another general aspect, a neural network operation apparatus includes: a receiver configured to receive a first activation gradient and a first threshold corresponding to a layer included in a neural network; and a processor configured to sparsify the first activation gradient based on the first threshold, determine a second activation gradient by performing a neural network operation based on the sparsified first activation gradient, determine a second threshold by updating the first threshold based on the second activation gradient, and perform a neural network operation based on the second activation gradient and the second threshold.

The first activation gradient and the second activation gradient may include any one of a gradient with respect to input activation, a gradient with respect to weight, and a gradient with respect to output activation.

For the determining of the second threshold, the processor may be configured to determine the second threshold by updating the first threshold over a predetermined number of iterations.

For the determining of the second threshold, the processor may be configured to determine the second threshold by updating the first threshold based on a target sparsity and a sparsity corresponding to a current iteration.

For the determining of the second threshold, the processor may be configured to determine the second threshold by multiplying the first threshold and a value of the target sparsity divided by the sparsity corresponding to the current iteration.

For the determining of the second threshold, the processor may be configured to: determine whether the second threshold exceeds a preset limited range; and correct the second threshold to a value within the limited range in response to the second threshold exceeding the limited range.

For the determining of the second threshold, the processor may be configured to determine the second threshold by initializing the first threshold based on the second activation gradient.

For the performing of the neural network operation based on the second activation gradient and the second threshold, the processor may be configured to: generate sparse data by sparsifying the second activation gradient based on the second threshold; and perform, using the sparse data and dense data, the neural network operation based on the second activation gradient and the second threshold.

The dense data may be stored in parallelized dense buffers.

For the performing of the neural network operation based on the second activation gradient and the second threshold, the processor may be configured to perform one or more multiply-accumulate (MAC) operations based on the second activation gradient.

In another general aspect, a processor-implemented neural network operation method includes: sparsifying, based on a threshold, a first activation gradient corresponding to a layer included in a neural network; determining a second activation gradient by performing a neural network operation based on the sparsified first activation gradient; updating the threshold based on a sparsity of the second activation gradient and a target sparsity; and performing a neural network operation based on the second activation gradient and the updated threshold.

The determining of the second activation gradient may correspond to a backpropagation operation, and the performing of the neural network operation based on the second activation gradient and the updated threshold may correspond to an image inference operation of a terminal.

The performing of the neural network operation based on the sparsified first activation gradient may include one or more multiply-accumulate (MAC) operators receiving the sparsified first activation gradient from one or more sparse buffers and performing the neural network operation.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like components and a repeated description related thereto will be omitted.

Figure 1:
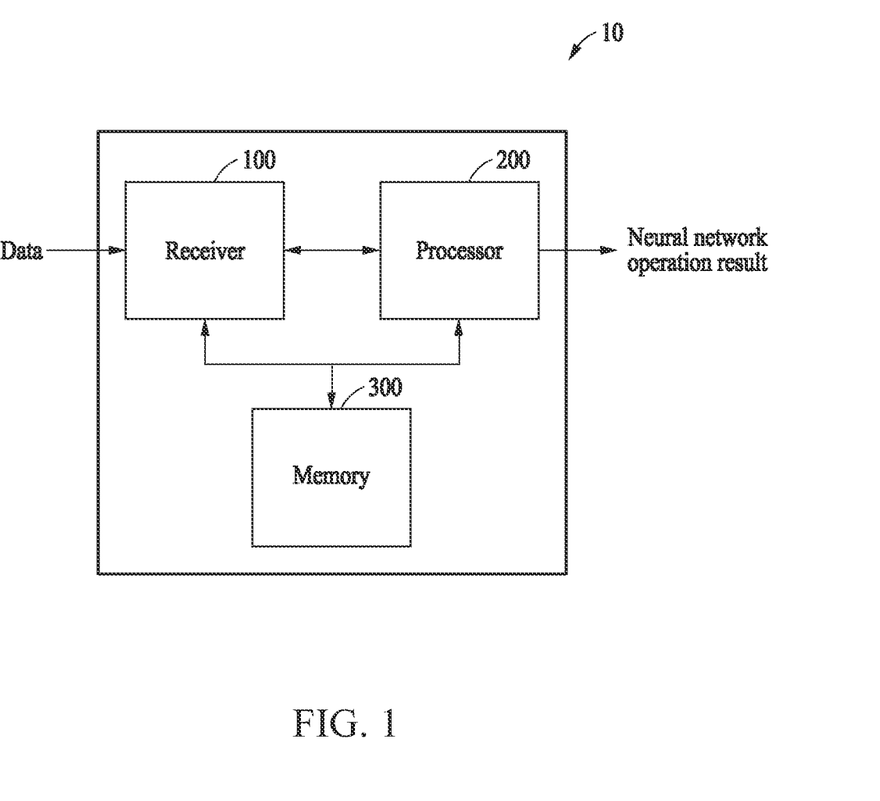
FIG. 1 illustrates an example of a neural network operation apparatus.

FIG. 1 illustrates an example of a neural network operation apparatus.

Referring to FIG. 1, a neural network operation apparatus 10 may perform a neural network operation using sparsification. The neural network operation apparatus 10 may output a neural network operation result by processing data using a neural network.

A sparsity may be a ratio of elements having a value of "0" to all elements. Sparsification may be an operation of skipping predetermined data in performing a neural network operation. For example, sparsification may be skipping zero or non-zero elements in a neural network operation. A sparsity may be found in tensors during a learning process. The sparsity may differ for each layer included in the neural network.

The neural network operation apparatus 10 may sparsify and process a portion of data used by the neural network for operation, thereby advantageously reducing the amount of operation and solving load imbalance.

The neural network operation apparatus 10 may train a neural network of the neural network operation apparatus 10. The neural network operation apparatus 10 may perform inference based on the trained neural network.

The neural network operation apparatus 10 may perform a neural network operation using an accelerator. The neural network operation apparatus 10 may be implemented inside or outside the accelerator.

The accelerator may include a graphics processing unit (GPU), a field-programmable gate array (FPGA), an application-specific integrated circuit (ASIC), and/or an application processor (AP). Alternatively, the accelerator may be implemented as a software computing environment, such as a virtual machine.

The neural network (or an artificial neural network) may include a statistical training algorithm in machine learning. The neural network may be a general model that has the ability to solve a problem, where nodes forming the network through synaptic combinations change a connection strength of synapses through training.

The nodes of the neural network may include a combination of weights or biases. The neural network may include one or more layers each including one or more nodes. The neural network may infer a desired result from a predetermined input by changing the weights of the nodes through learning.

The neural network may include a deep neural network (DNN). The neural network may include a convolutional neural network (CNN), a recurrent neural network (RNN), a perceptron, a multiplayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and/or an attention network (AN).

The neural network operation apparatus 10 may be implemented by a printed circuit board (PCB) such as a motherboard, an integrated circuit (IC), or a system on a chip (SoC). For example, the neural network operation apparatus 10 may be implemented by an application processor.

In addition, the neural network operation apparatus 10 may be implemented in a personal computer (PC), a data server, and/or a portable device.

The portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, and/or a smart device. The smart device may be implemented as a smart watch, a smart band, or a smart ring.

The neural network operation apparatus 10 may include a receiver 100 and a processor 200 (e.g., one or more processors). The neural network operation apparatus 10 may further include a memory 300 (e.g., one or more memories).

The receiver 100 may include a reception interface. The receiver 100 may receive an activation gradient related to the neural network operation and a threshold for sparsification. For example, the receiver 100 may receive a first activation gradient and a first threshold corresponding to a layer included in the neural network. The receiver 100 may output the received activation gradient and threshold to the processor 200.

The processor 200 may process data stored in the memory 300. The processor 200 may execute a computer-readable code (for example, software) stored in the memory 300 and instructions triggered by the processor 200.

The processor 200 may be a hardware data processing device including a circuit having a physical structure to perform desired operations. For example, the desired operations may include code or instructions included in a program implemented by the processor 200.

For example, the hardware-implemented data processing device may include a microprocessor, a central processing unit (CPU), a processor core, a multi-core processor, a multiprocessor, an application-specific integrated circuit (ASIC), and/or a field-programmable gate array (FPGA).

The processor 200 may sparsify the first activation gradient based on the first threshold. The processor 200 may obtain a second activation gradient by performing a neural network operation based on the sparsified first activation gradient.

The processor 200 may calculate a second threshold by updating the first threshold based on the second activation gradient. The processor 200 may calculate the second threshold by updating the first threshold over a predetermined number of iterations.

The processor 200 may calculate the second threshold by initializing the first threshold based on the second activation gradient. A non-limiting example of the process of initializing the first threshold will be described in greater detail with reference to FIG. 3 below.

The processor 200 may calculate the second threshold by updating the first threshold based on a target sparsity and a sparsity corresponding to a current iteration. The processor 200 may calculate the second threshold by multiplying the first threshold and a value of the target sparsity divided by the sparsity corresponding to the current iteration.

The processor 200 may determine whether the second threshold exceeds a preset limited range. The processor 200 may correct the second threshold to a value within the limited range in response to the second threshold exceeding the limited range.

The processor 200 may perform a neural network operation based on the second activation gradient and the second threshold. The processor 200 may generate sparse data by sparsifying the second activation gradient based on the second threshold.

The processor 200 may perform the neural network operation using the sparse data and dense data. The dense data may be stored in parallelized dense buffers. Non-limiting examples of sparse data and dense data will be described in greater detail with reference to FIG. 2 below.

The processor 200 may perform at least one multiply-accumulate (MAC) operation based on the second activation gradient.

The first activation gradient and the second activation gradient may include a gradient with respect to input activation, a gradient with respect to weight, or a gradient with respect to output activation.

The memory 300 may store instructions (or programs) executable by the processor 200. For example, the instructions may include instructions to perform an operation of the processor and/or an operation of each element of the processor.

The memory 300 may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), and/or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), and/or an insulator resistance change memory.

Figure 2:
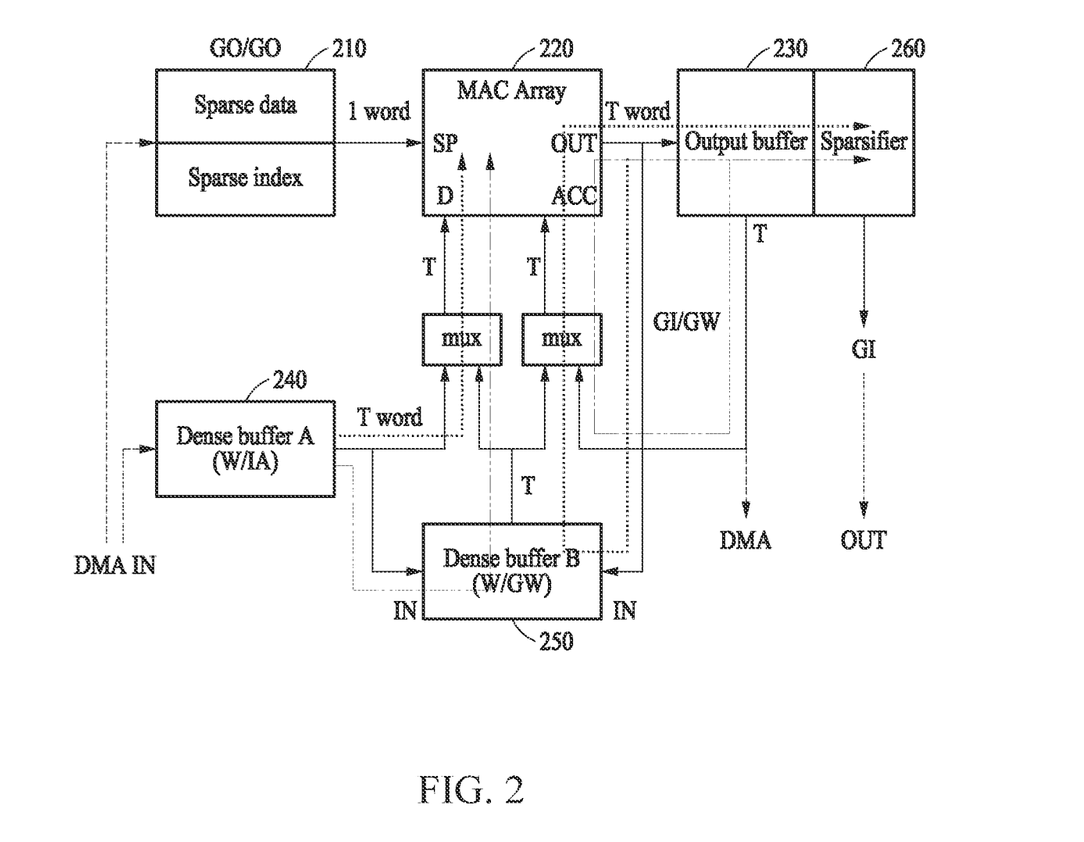
FIG. 2 illustrates an example of implementation of a neural network operation apparatus.

FIG. 2 illustrates an example of implementation of a neural network operation apparatus (e.g., the neural network operation apparatus of FIG. 1).

Referring to FIG. 2, the processor 200 may sparsify data related to a neural network. The processor 200 may train the neural network and/or perform a neural network operation using the sparsified data.

The process of training the neural network may include a feedforward operation and a backpropagation operation. The feedforward operation may be a process of calculating a value of a loss function by performing an operation using an input of each layer and a weight while moving in the direction from an input layer through hidden layers to an output layer.

The backpropagation operation may be a process of adjusting (or updating) weights of a neural network so as to minimize the value of the loss function in a state in which inputs and outputs of a neural network are known.

While performing the backpropagation operation, the processor 200 may train the neural network by sparsifying an activation gradient through a comparison with a threshold. The processor 200 may reduce an amount of computation for weight update and backpropagation occupying about ⅔ of training using sparsification.

The processor 200 may compare the activation gradient with the threshold in real time, thereby substantially reducing the amount of computation and memory access compared to a conventional neural network training method requiring preprocessing.

The processor 200 may maintain a high sparsity and determine the threshold such that the accuracy may not drop. The processor 200 may dynamically adjust a threshold for a subsequent iteration based on a sparsification distribution of a previous iteration, in the iteration in which the threshold is determined.

The neural network operation apparatus 10 may include a sparse buffer 210, a MAC array 220, an output buffer 230, a first dense buffer 240, a second dense buffer 250, and a sparsifier 260. For example, the sparse buffer 210, the output buffer 230, the first dense buffer 240, and the second dense buffer 250 may be included in a memory (for example, the memory 300 of FIG. 1).

The MAC array 220 and the sparsifier 260 may be included in a processor (for example, the processor 200 of FIG. 1). Alternatively, the MAC array 220 may be implemented outside the neural network operation apparatus 10, according to a non-limiting example.

The MAC array 220 may serially process sparse inputs received from the sparse buffer 210 and parallelize dense inputs from the first dense buffer 240 and the second dense buffer 250, thereby eliminating a reduction in utilization caused by load imbalance.

The processor 200 may perform a neural network operation based on an activation gradient (for example, a second activation gradient) and a threshold (for example, a second threshold). The processor 200 may generate sparse data by sparsifying the activation gradient based on the threshold. The sparse data may be stored in the sparse buffer 210.

The processor 200 may perform the neural network operation using the sparse data and dense data. Dense data may be stored in parallelized dense buffers (for example, the first dense buffer 240 and the second dense buffer 250).

The example of FIG. 2 shows the dataflow in the process of processing a backpropagation operation and weight update. In the example of FIG. 2, IA, W, GI, GO, and GW may denote an input activation, a weight, a gradient with respect to input activation, a gradient with respect to output activation, and a gradient with respect to weight, respectively.

The data GO, W, and GI on the left side may indicate the dataflow in backpropagation, and the data GO, IA, and GW on the right side may indicate the dataflow in the weight update process. GI, the output of the sparsifier 260, may indicate the dataflow in backpropagation.

Although FIG. 2 shows an example of sparsifying the gradient with respect to input activation, an example of sparsifying the gradient with respect to output activation or the gradient with respect to weight may also be performed.

The data shown in FIG. 2 may be communicated through direct memory access (DMA). The gradients with respect to activation may be loaded to the sparse buffer 210, and the input activation and the weight may be loaded to the dense buffers (for example, the first dense buffer 240 and the second dense buffer 250).

The MAC array 220 may serially receive the gradient (for example, the gradient with respect to input activation, the gradient with respect to output activation, or the gradient with respect to weight) from the sparse buffer 210 and perform a matrix multiplication between the gradient and the parallelized dense data.

The MAC array 220 may include T multipliers and T adders. T may be adjusted according to an example of hardware implementation.

The sparsifier 260 may calculate a statistical value of activation gradients of a subsequent layer, which is a result of matrix multiplication. The statistical value of activation gradients may include a probability distribution of activation gradients. For example, the statistical value of activation gradients may include an average, a variance, or a standard deviation of activation gradients.

The sparsifier 260 may update the threshold (for example, the first threshold) based on the calculated statistical value. The sparsifier 260 may update the activation gradient and output the updated activation gradient to the memory 300 (for example, DRAM).

Figure 3:
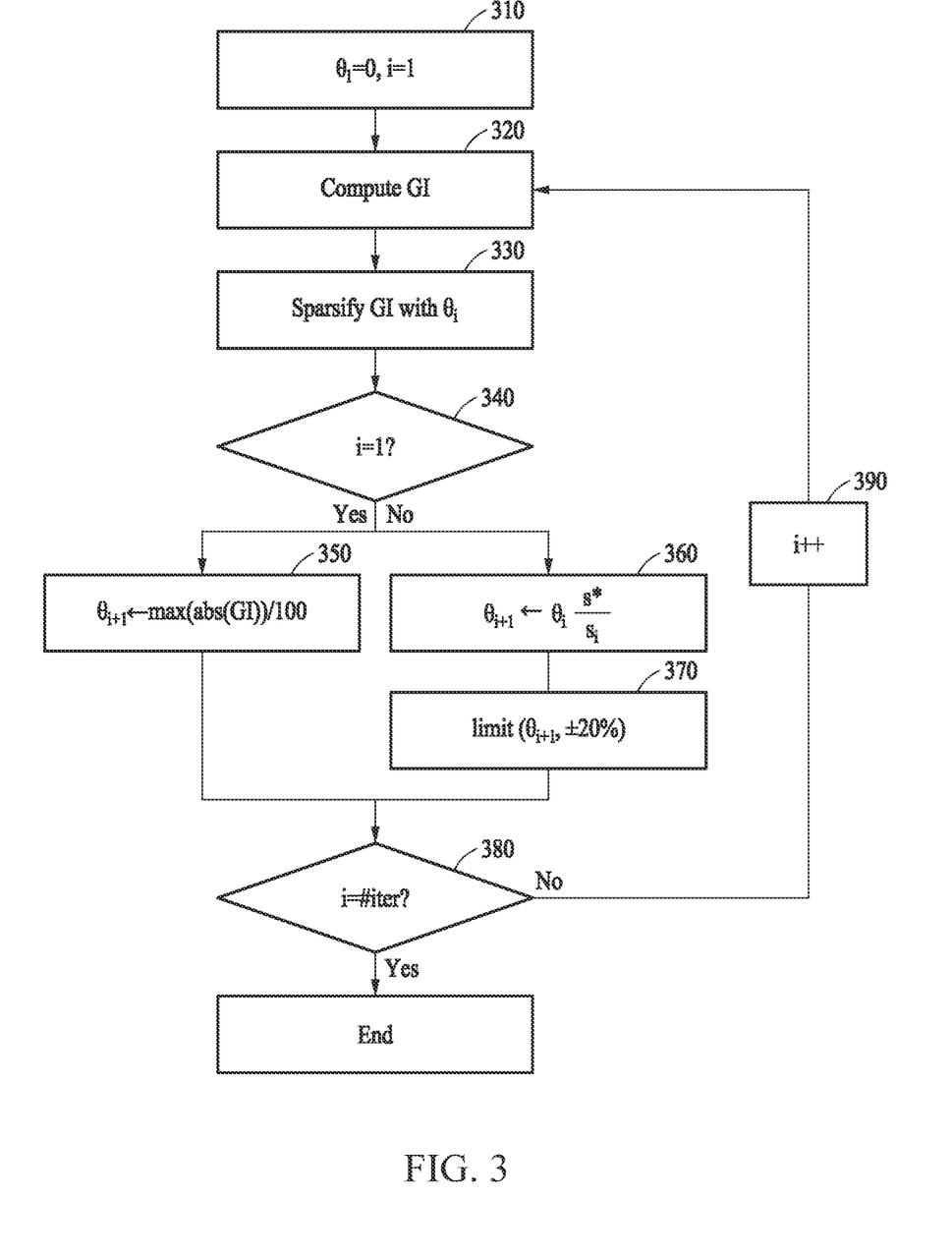
FIG. 3 illustrates an example of updating a threshold.

FIG. 3 illustrates an example of updating a threshold.

Referring to FIG. 3, in operation 310, a processor (for example, the processor 200 of FIG. 1) may set an initial threshold. For example, for an initial iteration (e.g., i=1), the processor 200 may set the initial threshold by substituting or setting "0" for $\theta_1$.

In operation 320, the processor 200 may calculate or compute an activation gradient (for example, a gradient with respect to input activation) based on the threshold. The processor 200 may calculate the activation gradient using a neural network operation, as described with reference to FIG. 2.

In operation 330, the processor 200 may sparsify the activation gradient based on a threshold of a current iteration. The processor 200 may sparsify a first activation gradient based on a threshold. For example, the processor 200 may sparsify activation gradients whose absolute values are less than the first threshold.

Before the threshold is updated, the processor 200 may sparsify the activation gradient based on the initial threshold (for example, "0"). When the threshold is updated, the processor 200 may sparsify the activation gradient based on the updated threshold.

In operation 330, the processor 200 may further obtain a second activation gradient by performing a neural network operation based on the sparsified first activation gradient. For example, the processor 200 may obtain the second activation gradient through a neural network operation using a MAC array (for example, the MAC array 220 of FIG. 2). The sparsification of the first activation gradient may be sparsification performed in a previous iteration.

The processor 200 may calculate a second threshold by updating the first threshold based on the second activation gradient. The processor 200 may calculate the second threshold by updating the first threshold over a predetermined number of iterations.

In operation 340, to start an iteration, the processor 200 may determine whether an index of an iteration loop is "1". If i is "1", the processor 200 may calculate the second threshold by initializing the first threshold, in operation 350.

In operation 350, the processor 200 may calculate the second threshold by initializing the first threshold based on the second activation gradient. For example, when the index of the iteration loop is "1", the processor 200 may calculate the second threshold by initializing the first threshold, e.g., using Equation 1 below.

$$\theta_{i+1} \leftarrow \frac{\max(\text{abs}(GI))}{100} \qquad \text{Equation 1}$$

In Equation 1, $\theta_{i+1}$ denotes a threshold (for example, the second threshold) for a subsequent iteration.

If i is not "1", the processor 200 may calculate the second threshold by updating the first threshold, in operation 360. In operation 360, the processor 200 may calculate the second threshold by updating the first threshold based on a target sparsity and a sparsity corresponding to a current iteration.

The processor 200 may calculate the second threshold by multiplying the first threshold and a value of the target sparsity divided by the sparsity corresponding to the current iteration. For example, when the index of the iteration loop is not "1", the processor 200 may calculate the second threshold, e.g., using Equation 2 below.

$$\theta_{i+1} \leftarrow \theta_i \cdot \frac{s^*}{s_i} \qquad \text{Equation 2}$$

In Equation 2, s* denotes the target sparsity, and s, denotes the sparsity of the current iteration.

In operation 370, the processor 200 may determine whether the second threshold exceeds a preset limited range. The processor 200 may correct the second threshold to a value within the limited range in response to the second threshold exceeding the limited range. For example, the limited range may be from a value 20% less than the first threshold to a value 20% greater than the first threshold. The limited range may vary depending on an example.

Through the threshold update process described above, the processor 200 may immediately sparsify a result of calculating a partial activation gradient by reducing dependency between activation gradients when compared to a typical scheme of sorting activation gradients and extracting top k activation gradients, thereby reducing the amount of communication with the memory (for example, the memory 300 of FIG. 1) and thereby simplifying the hardware implementation.

In operation 380, the processor 200 may determine whether i is equal to a predetermined iteration value. In response to i being different from the predetermined iteration value, the processor 200 may add "1" to i, in operation 390. Thereafter, the processor 200 may perform operation 320 again based on the updated threshold (the second threshold).

In response to i being equal to the predetermined iteration value, the processor 200 may terminate updating the threshold. The processor 200 may share the updated threshold with a number of elements of the neural network. For example, the processor 200 may share the updated threshold with a portion of layers of the neural network.

Figure 4:
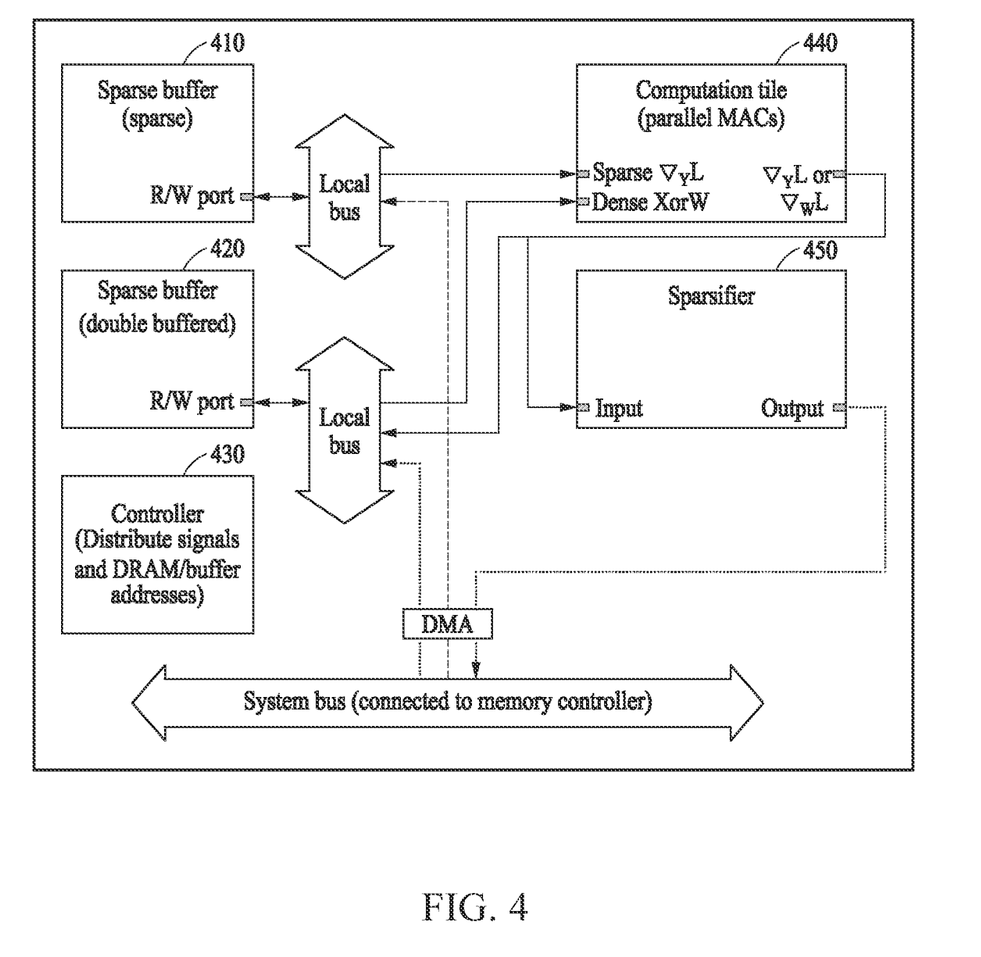
FIG. 4 illustrates an example of implementation of a neural network operation apparatus.

FIG. 4 illustrates an example of implementation of a neural network operation apparatus (e.g., the neural network operation apparatus of FIG. 1).

Referring to FIG. 4, the neural network operation apparatus 10 may include a first sparse buffer 410, a second sparse buffer 420, a controller 430, a computation tile 440, and a sparsifier 450.

The first sparse buffer 410 may include a read and write port. The first sparse buffer 410 may output a sparsified activation gradient to the computation tile 440 through a local bus.

The second sparse buffer 420 may include a read and write port. The second sparse buffer 420 may output a sparsified activation gradient to the computation tile 440 through a local bus.

The first sparse buffer 410 and the second sparse buffer 420 may operate in the same manner as the sparse buffer 210 of FIG. 2.

The controller 430 may distribute signals for processing data, and DRAM and buffer addresses. The controller 430 may be included in a processor (for example, the processor 200 of FIG. 1).

The computation tile 440 may include parallel MAC operators. The parallel MAC operators included in the computation tile 440 may operate in the same manner as the MAC array 220 of FIG. 1.

The sparsifier 450 may sparsify the activation gradient while updating a threshold. The sparsifier 450 may be included in the processor 200. The sparsifier 450 may operate in the same manner as the sparsifier 260 of FIG. 2.

The processor 200 may sparsify one or more inputs on which a matrix multiplication is to be performed. Therefore, the processor 200 may sparsify different types of data and perform a matrix multiplication between the sparsified data.

The processor 200 may perform neural network inference using the matrix multiplication between the sparsified data. The processor 200 may perform a variety of neural network operations including parallel multiplication and addition.

Figure 5:
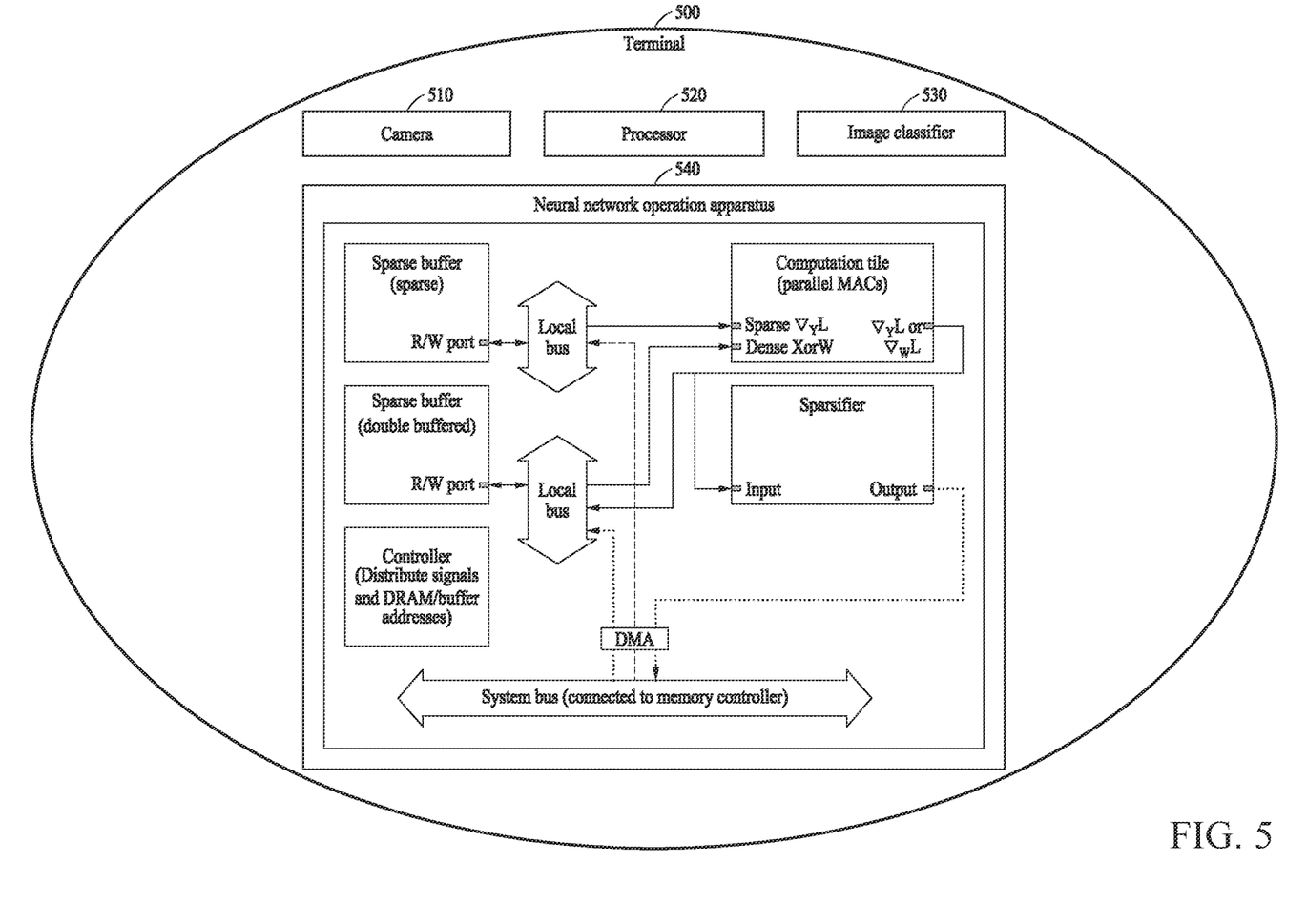
FIG. 5 illustrates an example of a terminal to which a neural network operation apparatus is applied.

FIG. 5 illustrates an example of a terminal to which a neural network operation apparatus (e.g., the neural network operation apparatus of FIG. 1) is applied.

Referring to FIG. 5, a neural network operation apparatus 540 may be implemented or included in a terminal 500. The terminal 500 may include a camera 510, a processor 520, an image classifier 530, and the neural network operation apparatus 540. The processor 520 may control an operation of the terminal 500.

The neural network operation apparatus 540 may perform neural network training and inference on lightened hardware using sparsification.

In general, the terminal 500 (for example, a smart phone) may use limited power energy. Thus, it may be difficult for a typical terminal to handle training requiring a larger amount of computation than inference. However, the neural network operation apparatus 540 may dramatically reduce the amount of computation and memory access using the sparsification method described above, thereby saving energy in the terminal 500 (e.g., a mobile device).

The image classifier 530 may perform image inference. Although the image classifier 530 is separately illustrated in the example of FIG. 5, a separate image classifier 530 may be unnecessary in a case of performing inference using a neural network operation in the form the same as in the neural network operation apparatus 10 (for example, for a matrix multiplication between sparse data and dense data).

Figure 6:
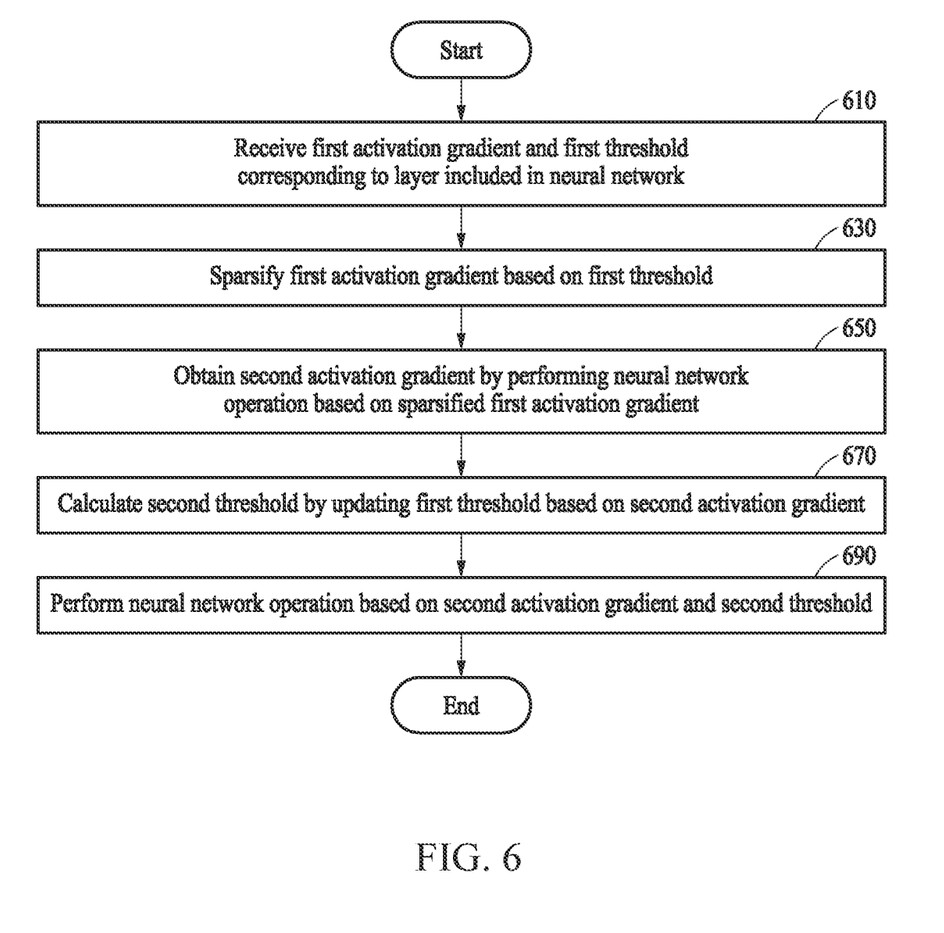
FIG. 6 illustrates an example of the operation of a neural network operation apparatus.

FIG. 6 illustrates an example of the operation of a neural network operation apparatus (e.g., the neural network operation apparatus of FIG. 1).

Referring to FIG. 6, in operation 610, the receiver 100 may receive a first activation gradient and a first threshold corresponding to a layer included in a neural network.

In operation 630, the processor 200 may sparsify the first activation gradient based on the first threshold.

In operation 650, the processor 200 may obtain a second activation gradient by performing a neural network operation based on the sparsified first activation gradient.

In operation 670, the processor 200 may calculate a second threshold by updating the first threshold based on the second activation gradient. The processor 200 may calculate the second threshold by updating the first threshold over a predetermined number of iterations.

The processor 200 may calculate the second threshold by initializing the first threshold based on the second activation gradient.

The processor 200 may calculate the second threshold by updating the first threshold based on a target sparsity and a sparsity corresponding to a current iteration. The processor 200 may calculate the second threshold by multiplying the first threshold and a value of the target sparsity divided by the sparsity corresponding to the current iteration.

The processor 200 may determine whether the second threshold exceeds a preset limited range. The processor 200 may correct the second threshold to a value within the limited range in response to the second threshold exceeding the limited range.

In operation 690, the processor 200 may perform a neural network operation based on the second activation gradient and the second threshold. The processor 200 may generate sparse data by sparsifying the second activation gradient based on the second threshold.

The processor 200 may perform the neural network operation using the sparse data and dense data. The dense data may be stored in parallelized dense buffers.

The processor 200 may perform at least one multiply-accumulate (MAC) operation based on the second activation gradient.

The first activation gradient and the second activation gradient may include a gradient with respect to input activation, a gradient with respect to weight, or a gradient with respect to output activation.

The neural network operation apparatuses, receivers, processors, memories, sparse buffers, MAC arrays, output buffers, first dense buffers, second dense buffers, sparsifiers, first sparse buffers, second sparse buffers, controllers, computation tiles, terminals, cameras, image classifiers, neural network operation apparatus 10, receiver 100, processor 200, memory 300, sparse buffer 210, MAC array 220, output buffer 230, first dense buffer 240, second dense buffer 250, sparsifier 260, sparse buffer 410, second sparse buffer 420, controller 430, computation tile 440, sparsifier 450, terminal 500, camera 510, processor 520, image classifier 530, neural network operation apparatus 540, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented neural network operation method, comprising:
generating a first sparse data by sparsifying, during a first iteration, a first activation gradient based on a first threshold corresponding to a layer included in a neural network;
determining a second activation gradient of a second iteration by performing a neural network operation based on the first sparse data and dense data;
determining a second threshold for sparsifying the second activation gradient by updating the first threshold based on the second activation gradient;

generating a second sparse data by sparsifying, during the second iteration, based on the second threshold, the second activation gradient;

performing a neural network operation, using the second sparse data and the dense data, based on the second activation gradient and the second threshold, wherein the determining of the second threshold comprises determining the second threshold by updating the first threshold based on a target sparsity and a sparsity corresponding to a current iteration, the determining of the second activation gradient corresponds to a backpropagation operation, and the performing of the neural network operation based on the second activation gradient and the second threshold corresponds to an image inference operation of a terminal.

2. The method of claim 1, wherein the first activation gradient and the second activation gradient comprise any one of a gradient with respect to input activation, a gradient with respect to weight, and a gradient with respect to output activation.

3. The method of claim 1, wherein the determining of the second threshold comprises determining the second threshold by updating the first threshold over a predetermined number of iterations.

4. The method of claim 1 wherein the determining of the second threshold comprises determining the second threshold by multiplying the first threshold and a value of the target sparsity divided by the sparsity corresponding to the current iteration.

5. The method of claim 1, wherein the determining of the second threshold comprises:

determining whether the second threshold exceeds a preset limited range; and correcting the second threshold to a value within the limited range in response to the second threshold exceeding the limited range.

6. The method of claim 1, wherein the determining of the second threshold comprises determining the second threshold by initializing the first threshold based on the second activation gradient.

7. The method of claim 1, wherein the dense data are stored in parallelized dense buffers.

8. The method of claim 1, wherein the performing of the neural network operation based on the second activation gradient and the second threshold comprises performing one or more multiply-accumulate (MAC) operations based on the second activation gradient.

9. The method of claim 1, further comprising generating a trained neural network by training the neural network using the second sparse data.

10. A non-transitory computer-readable storage medium storing instructions that, when executed by a processor, configure the processor to perform the method of claim 1.

11. A neural network operation apparatus, comprising:
a processor configured to:
generate a first sparse data by sparsifying, during a first iteration, a first activation gradient based on a first threshold corresponding to a layer included in a neural network;

determine a second activation gradient of a second iteration by performing a neural network operation based on the first sparse data and dense data;

determine a second threshold for sparsifying the second activation gradient by updating the first threshold based on the second activation gradient;

generate a second sparse data by sparsifying, during the second iteration, based on the second threshold, the second activation gradient;

perform a neural network operation, using the second sparse data and the dense data, based on the second activation gradient and the second threshold, wherein the determining of the second threshold comprises updating the first threshold based on a target sparsity and a sparsity corresponding to a current iteration, the determining of the second activation gradient corresponds to a backpropagation operation, and the performing of the neural network operation based on the second activation gradient and the second threshold corresponds to an image inference operation of a terminal.

12. The apparatus of claim 11, wherein the first activation gradient and the second activation gradient comprise any one of a gradient with respect to input activation, a gradient with respect to weight, and a gradient with respect to output activation.

13. The apparatus of claim 11, wherein, for the determining of the second threshold, the processor is further configured to determine the second threshold by updating the first threshold over a predetermined number of iterations.

14. The apparatus of claim 11, wherein, for the determining of the second threshold, the processor is further configured to determine the second threshold by multiplying the first threshold and a value of the target sparsity divided by the sparsity corresponding to the current iteration.

15. The apparatus of claim 11, wherein, for the determining of the second threshold, the processor is further configured to:

determine whether the second threshold exceeds a preset limited range; and correct the second threshold to a value within the limited range in response to the second threshold exceeding the limited range.

16. The apparatus of claim 11, wherein, for the determining of the second threshold, the processor is further configured to determine the second threshold by initializing the first threshold based on the second activation gradient.

17. The apparatus of claim 11, wherein the dense data are stored in parallelized dense buffers.

18. The apparatus of claim 11, wherein, for the performing of the neural network operation based on the second activation gradient and the second threshold, the processor is further configured to perform one or more multiply-accumulate (MAC) operations based on the second activation gradient.

19. The apparatus of claim 11, wherein the processor is configured to generate a trained neural network by training the neural network using the second sparse data.

20. A processor-implemented neural network operation method, comprising:

generating a first sparse data by sparsifying, during a first iteration, based on a first threshold, a first activation gradient corresponding to a layer included in a neural network;

determining a second activation gradient of a second iteration by performing a neural network operation based on the first sparse data and dense data;

generating a second threshold by updating the first threshold based on a sparsity of the second activation gradient corresponding to a current iteration and a target sparsity; and performing a neural network operation based on the second activation gradient and the second threshold, wherein the determining of the second activation gradient corresponds to a backpropagation operation; and the performing of the neural network operation based on the second activation gradient and the second threshold corresponds to an image inference operation of a terminal.

21. The method of claim 20, wherein the performing of the neural network operation based on the sparsified first activation gradient comprises one or more multiply-accumulate (MAC) operators receiving the sparsified first activation gradient from one or more sparse buffers and performing the neural network operation.

\* \* \* \* \*